INVENTORS
William E. Morey
Ralph G. Nichols
BY Daniel U. Rich ATTORNEY

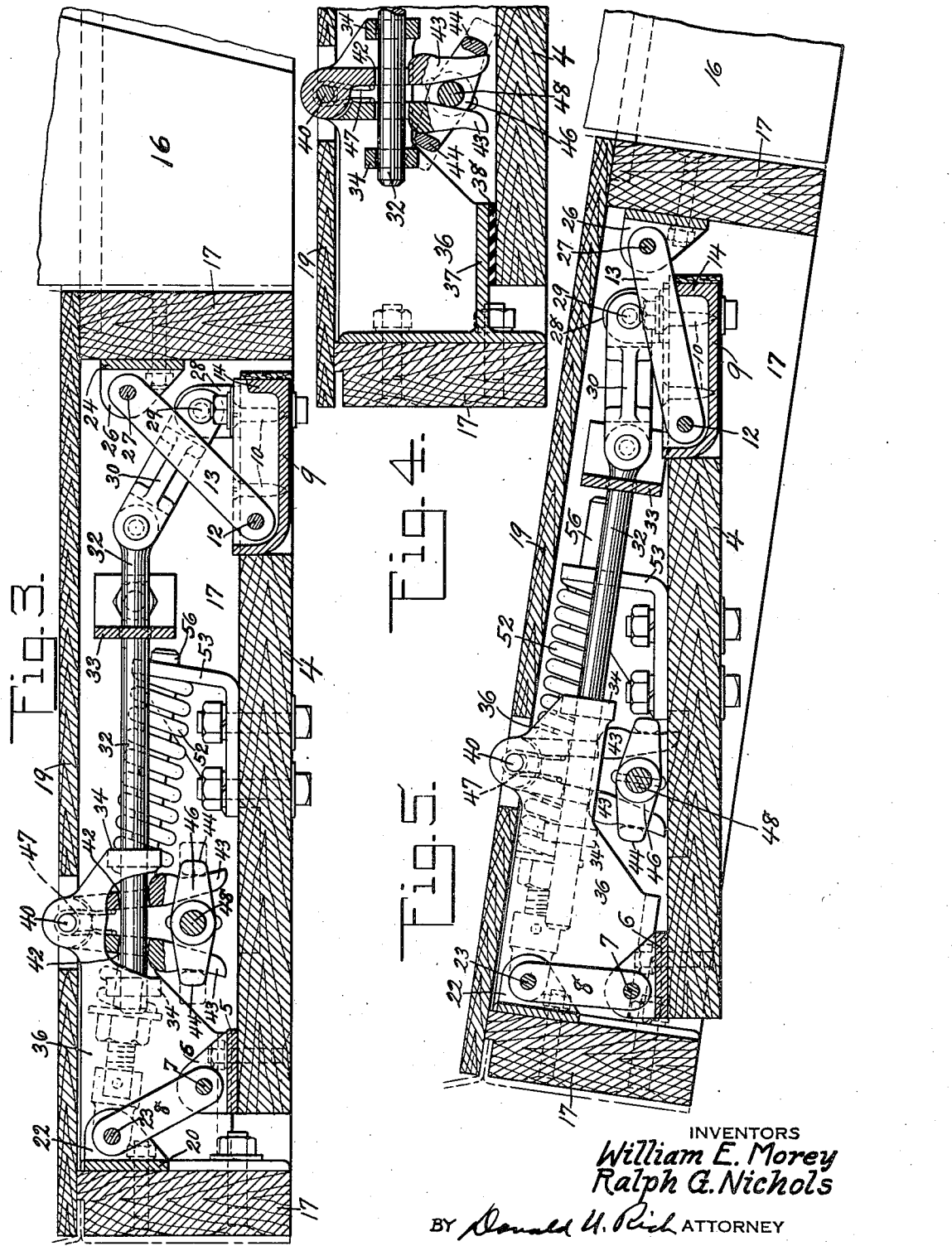

Patented May 18, 1943

2,319,743

UNITED STATES PATENT OFFICE 2,319,743

RECLINING SEAT

William E. Morey and Ralph G. Nichols, St. Charles, Mo., assignors to American Car and Foundry Company, New York, N. Y., a corporation of New Jersey Application November 18, 1939, Serial No. 305,054

7 Claims. (Cl. 155—116)

This invention relates to reclining seats in general and in particular to such seats for use in road or rail vehicles wherein the seat back and cushion move in unison to a reclining position.

The majority of reclining seats now in use have the back portion movable relative to the cushion with the result that a person can only be in the most comfortable position at one point of seat back adjustment. As the seat back is inclined the angular relation between the passenger's legs and back varies and may vary to such a degree as to be very tiring to the passenger. The major reason for such discomfort to the passenger is due to the fact that in a number of the inclined positions the lower portion of the spine is not properly supported, this being due to the change in angular relation between the seat back and cushion. It has been proven by experiment that the greatest comfort is obtained when the seat back and cushion have a constant angular relationship, with the enclosed angle being approximately 90 degrees. It is an object, therefore, of the present invention to provide a reclining seat in which the seat back and the cushion are at a constant angular relation to each other.

A further object of the invention is the provision of a reclining seat in which the rear portion of the cushion lowers as the seat back assumes a more reclining position.

A still further object of the invention is the provision of a seat having the back and cushion rockably supported upon the seat base by means of links.

A yet further object of the invention is the provision of a reclining seat the motion of which may be accurately controlled by an extremely simple operating mechanism.

These and other objects of the invention will be apparent to persons skilled in the art from a study of the following description and accompanying drawings, in which:

Fig. 3 is a sectional view taken substantially on line 3—3 of Fig. 2 but with a portion of the structure broken away to more clearly disclose the control mechanism;

Fig. 4 is a sectional view taken substantially on line 4—4 of Fig. 2 but disclosing the control mechanism in released position;

Fig. 5 is a sectional view similar to Fig. 3 but showing the mechanism in fully reclined position.

Figure 1:
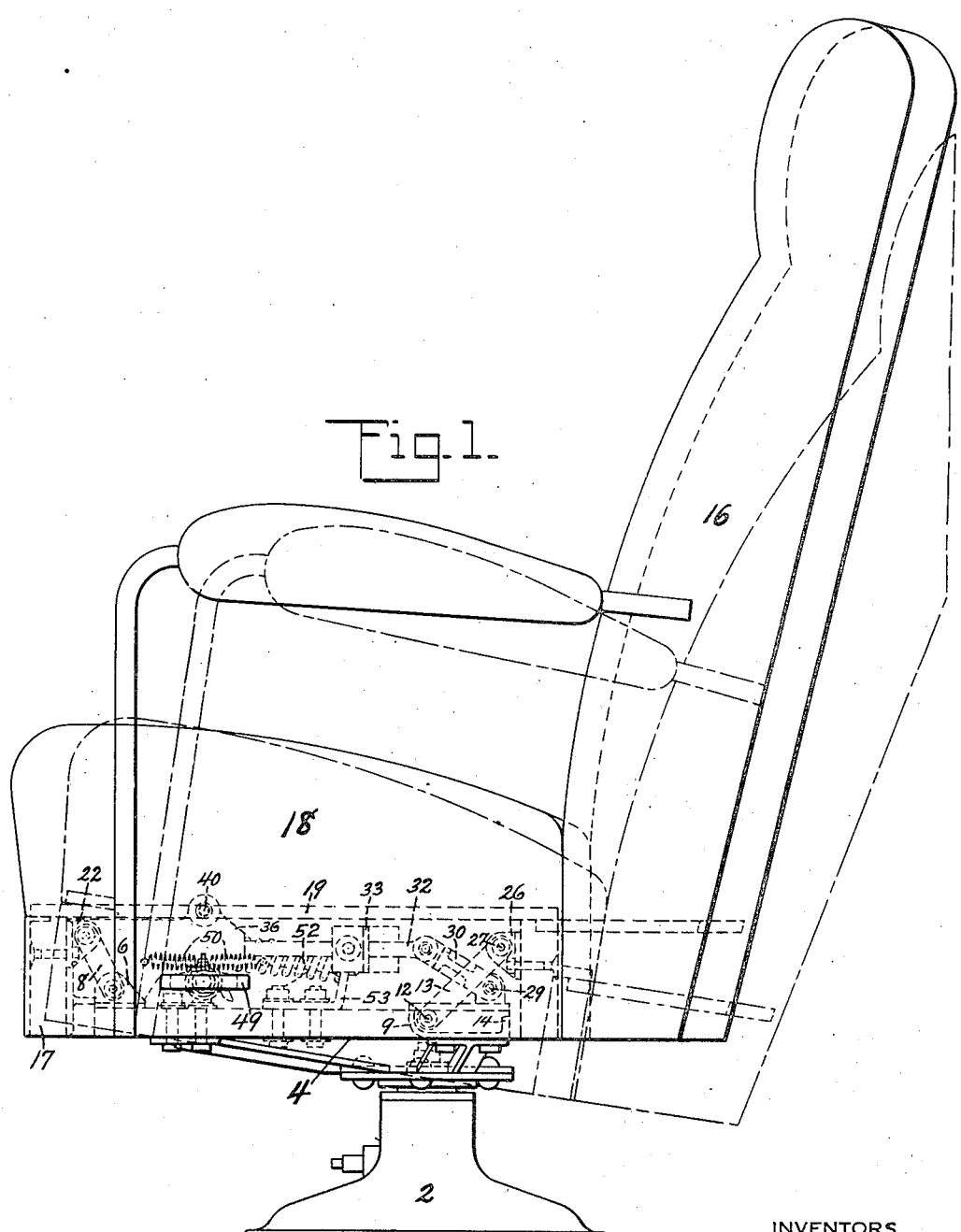
Figure 1 is an end elevational view of the improved seat and disclosing the seat by full lines in normal position and by line and dash in the fully tilted or reclining position.

Referring now to the drawings in detail, it will be seen that the seat is revolvably supported upon a pedestal 2 by means of a seat base 4 which may revolve only in a substantially horizontal plane. The seat base may be made of any desired material but in the present instance is shown as constructed of wood carrying adjacent its front corners lugs 5 formed with upstanding ears 6, across which a pin 7 may extend and upon which is pivotally mounted the lower ends of front supporting links 8. The base frame is also provided adjacent its rear corners with flanged U-shaped castings 9 secured to the base by any suitable means such as screws 10. Pins 12 extend across the sides of each flanged U-shaped casting and pivotally support the lower ends of rear supporting links 13 of such a length as to rest upon and extend outwardly beyond rear vertical extending flange 14 of the flanged U-shaped castings.

The seat portion proper consists of a seat back 16 preferably rigidly connected to a skeleton seat frame 17 upon which rests a cushion 18 preferably secured to cushion supporting board 19, which latter may be either permanently or removably secured to the skeleton seat frame. The front cross board of the skeleton seat frame has secured thereto adjacent its ends lugs 20 having outstanding ears 22 across which extend pins 23 rotatably supported upon the upper ends of front supporting links 8 previously referred to. The rear cross member of the skeleton seat frame has secured thereto adjacent its ends lugs 24 formed with outstanding ears 26 across which extend pins 27 rotatably supported upon the upper ends of rear supporting links 13 previously referred to. In this manner the seat back, skeleton seat frame and cushion are link supported at a plurality of points upon the rotatably mounted seat base. Attention is directed to the fact that by changing the relative lengths of the front and rear supporting links, the normal inclination of the cushion supporting board and, therefore, the cushion surface may be controlled as can also the amount of angular movement permitted. Attention is also particularly directed to the fact that the front and rear supporting links are oppositely directed, thus certain of the forces acting on the links will tend to cancel each other and any mechanism controlling the position of the skeleton seat frame will need to control only the difference in forces acting upon the links.

Figure 2:
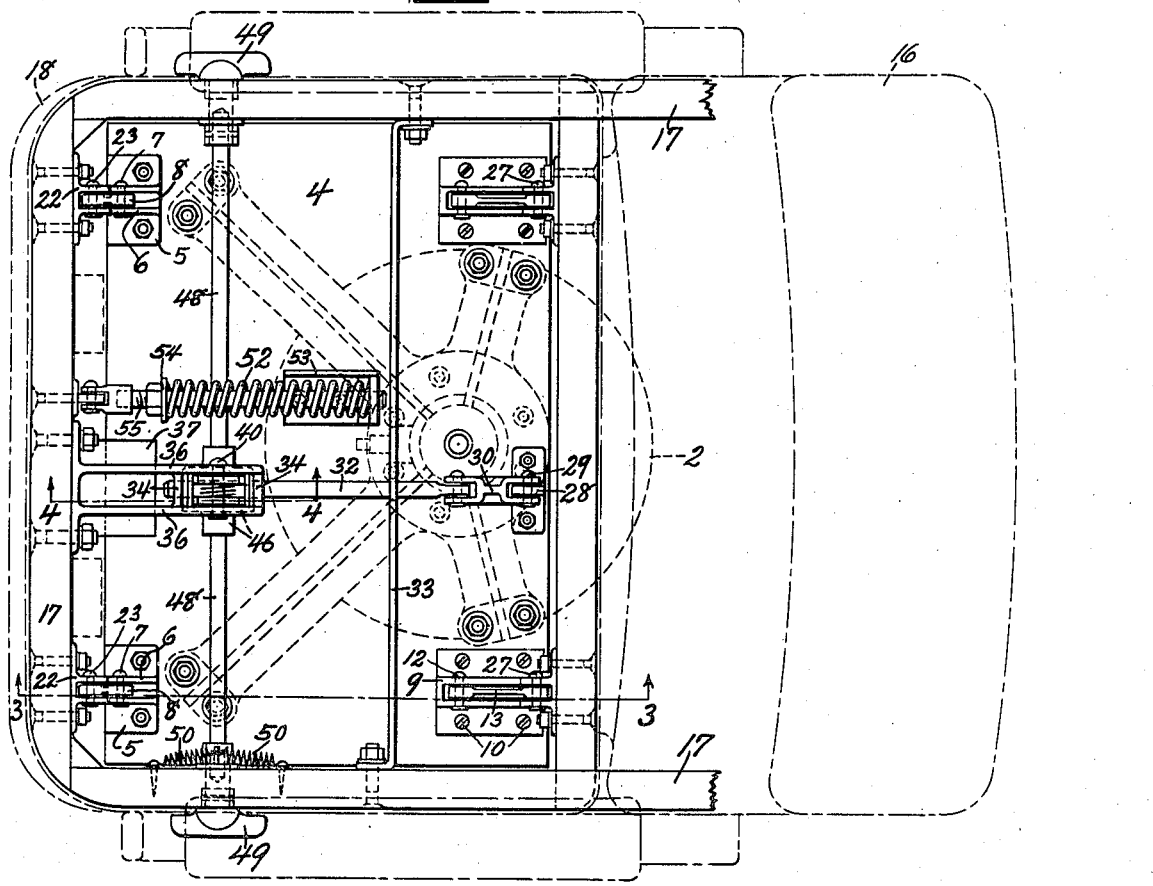
Fig. 2 is a plan view of the seat supporting and reclining mechanism.
Figure 6:
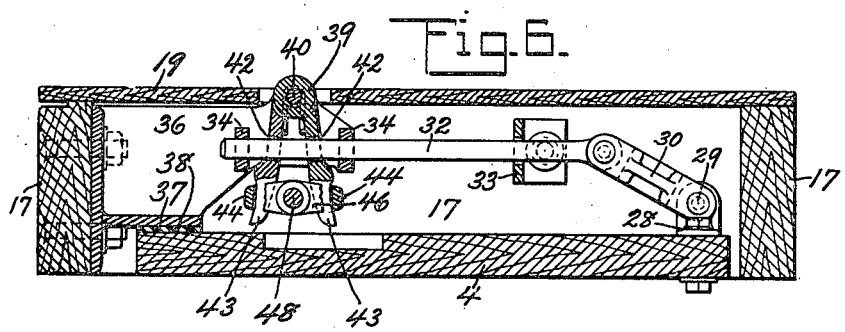
Fig. 6 is a sectional view taken substantially at the central portion of Fig. 2 and disclosing only the tilt control mechanism.

As clearly shown in the drawings, the difference in forces acting upon the links is controlled by means of a mechanism attached to the seat base and adjustably secured to the skeleton seat frame. This mechanism comprises a lug 28 secured to the seat base adjacent the rear edge thereof and carrying a pin 29 upon which is rotatably mounted the lower end of control link 30. The upper end of this control link is pin connected to a thrust rod 32 extending forwardly through a supporting and guiding bracket 33 carried by the sides of the skeleton seat frame. The forward end of the thrust rod extends through openings formed in supporting and guiding bars 34 rigidly connected to the spaced arm 36 of a bracket rigidly connected to an intermediate portion of the front cross member of the skeleton seat frame. The spaced arms are also joined together and rigidified by means of a bottom connection 37 adapted to normally rest on a rubber cushion 38 carried either by the seat base 4 or by the bottom connection just referred to. In order to control the movements of the thrust rod and thereby the movements of the skeleton seat frame, gripping jaws 39 are pivotally mounted upon pin 40 supported by the spaced arms 36. These gripping jaws are formed with intermediate openings 42 adapted to engage the thrust rod 32 and with lower extensions 43, which extensions are located between cross bars 44 of release yoke 46. Any suitable means may be used to urge the gripping jaws into engagement with the thrust rod, but in the present instance this means consists of a torsion spring 47 wrapped around the pin 40 and having its ends engaging the gripping jaws to force the latter away from each other. The holes through the gripping jaws will have their axes substantially in alignment and in alignment with the axis of the thrust rod when the jaws are in their released position but will have their axes at an angle to the axis of the thrust rod when in the gripping position. In this way free movement of the thrust rod is permitted when the gripping jaws are released, while the diagonally opposite edges of the holes will engage the thrust rod when the jaws are in their gripping position. In order to support and operate the release yoke an operating rod 48 is provided to which the yoke is rigidly connected and this rod extends outwardly through one or both sides of the skeleton seat frame and carries at its end or ends an operating knob 49. The operating rod is held in its normal position by means of a centering spring 50 (Fig. 2) attached at its ends to the skeleton frame and at its central portion to a lug rigidly fastened upon the operating rod. Thus it will be seen that by rotation of the operating knob in either direction the release yoke will move the gripping jaws inwardly (Fig. 4), thus releasing the thrust rod and that upon release of the operating knob the spring 50 will return it to normal position permitting the gripping jaws to again promptly engage the thrust rod.

It will be seen that the front supporting links 8 are inclined at a greater angle to the horizontal than are the rear supporting links 13 (Fig. 3) and this is true whether the seat is in the normal or reclined position. Due to the different angular relation existing between the supporting links, the horizontal components of the forces acting on the links will be of different magnitude and in opposite directions and the difference in these components must be absorbed by the thrust rod and gripping jaws in order to retain the seat in its desired position. That the thrust rod and gripping jaws can absorb this thrust is evident from the drawings, for if the skeleton seat frame is to recline it must move downwardly and rearwardly at its rear edge, but such downward and rearward movement is resisted by the thrust rod acting in compression. It will be noted that the front supporting links will have their axes located at an angle to and rearwardly of a vertical plane through the lower pivotal axes 7 thereof when the seat is in the fully reclined position and, therefore, the horizontal components of the forces acting in the links will be of different magnitude but in the same drection. As a result the seat would be rather hard to return to its normal position, therefore, a compression spring 52 is provided bearing at its rear end upon a bracket 53 secured to the base frame and bearing at its front end upon a washer and nut 54 adjustably secured to rod 55 pivotally connected to the front cross member of the skeleton seat frame. In this manner the seat will be urged toward its normal position upon release of the gripping jaws and the degree of pressure in the spring may be controlled by adjustment of the nut 54.

In operating the mechanism it is only necessary for an operator to turn the operating knob in either direction. This will cause the gripping jaws to release the thrust rod and the passenger's weight will, due to the difference in angular relationship of the supporting links, cause the seat to assume an inclined position and compress the spring 52. Release of the operating knob will cause the gripping jaws to hold the thrust rod in any position which it then occupies. The rotation of the operating knob causes the release yoke to move the gripping jaws inwardly to the position shown in Fig. 4 and if the seat is fully reclined and the operating rod released, the parts assume the position shown in Fig. 5.

In constructing the seats it has been found advisable for the thrust rods to be made of a material which will resist any bending and yet one which can be readily gripped by the sharp edges of the holes in the gripping jaws. It is also advisable that the gripping jaws be made of exceptionally hard material or that a hardened insert be used at the openings and through which the thrust rod projects. In the figures four upwardly directed and inclined supporting links have been shown, but it is possible to increase or decrease this number and also it may be found advisable to utilize more than one thrust rod and gripping jaw arrangement per seat to control the movements thereof.

While the invention has been described more or less in detail by reference to several modifications thereof, further modifications other than those shown and described will suggest themselves to persons skilled in the art and all such modifications are contemplated as will fall within the scope of the appended claims defining our invention:

What is claimed is:

1. A reclining seat comprising in combination, a seat base carried by a supporting structure, a seat frame having a cushion receiving portion and a seat back rigidly attached thereto, angularly disposed links pivotally supporting said seat frame upon said seat base, and lock means connecting said seat frame and seat base and controlling pivotal movement of said links, said lock means including gripping jaws carried by said seat frame and engaging a thrust rod pivotally connected with said seat base.

2. A reclining seat comprising in combination, a seat base carried by a supporting structure, a seat frame having a cushion receiving portion, upwardly diverging links pivotally supporting each side of said frame upon said base for reclining movement of the frame, and releasable lock means controllably connecting said seat frame and base, said means comprising gripping jaws pivotally connected to said seat frame, a thrust rod engageable by said gripping jaws, and a link pivotally connecting said thrust rod and base.

3. A reclining seat comprising in combination, a seat base carried by a supporting structure, a seat frame having a cushion receiving portion, upwardly diverging links pivotally supporting each side of said frame upon said base for reclining movement of the frame, and releasable lock means controllably connecting said seat frame and base, said lock means comprising gripping jaws pivotally connected to said seat frame, a thrust rod engageable by said gripping jaws and pivotally connected with said base, and operating means engaging said gripping jaws to move the same and control the reclining movements of said seat frame.

4. A reclining seat comprising in combination, a seat frame pivotally carried by a supporting structure, a seat back connected to said seat frame, and means controlling reclining of said seat back, said means comprising in part at least, a thrust rod pivotally connected with the supporting structure, gripping jaws pivotally carried by said frame, resilient means forcing said jaws into gripping engagement with said thrust rod, and operating means movable to overcome said resilient means and release said jaws from engagement with said thrust rod.

5. A reclining seat comprising in combination, a seat frame pivotally carried by a supporting structure, a seat back connected to said seat frame, and means controlling reclining of said seat back, said means comprising in part at least, a thrust rod pivotally connected with the supporting structure, gripping jaws pivotally carried by said frame, resilient means forcing said jaws into gripping engagement with said thrust rod, and operating means engaging said gripping jaws to release the same from gripping engagement with said thrust rod.

6. A reclining seat comprising in combination, a seat supporting structure, a seat frame, links pivotally supporting said seat frame on the supporting structure, a seat back connected to said seat frame, and means controlling reclining of the seat back, said means comprising, a thrust rod pivotally connected with the supporting structure, gripping jaws pivotally connected to said frame, a spring forcing said jaws into gripping engagement with said thrust rod, and operating means engaging said jaws to release the same from gripping engagement with said thrust rod.

7. A reclining seat comprising in combination, a seat supporting structure, a seat frame, links pivotally supporting said seat frame on the supporting structure, a seat back connected to said seat frame, and means controlling reclining of the seat back, said means comprising, spaced gripping jaws pivotally connected to said frame, a thrust rod pivotally connected with the supporting structure and passing through said spaced jaws, a spring forcing said jaws apart and into gripping engagement with said thrust rod, and operating means engaging said thrust jaws to move the jaws toward each other and out of gripping engagement with the thrust rod.

WILLIAM E. MOREY.
RALPH G. NICHOLS.